(12) United States Patent  
Gimblet et al.

(10) Patent No.: US 9,274,302 B2
(45) Date of Patent: Mar. 1, 2016

(54) FIBER OPTIC CABLES WITH EXTRUDED ACCESS FEATURES FOR ACCESS TO A CABLE CAVITY

(75) Inventors: Michael John Gimblet, Conover, NC (US); Julian Latelle Greenwood, III, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 593 days.

(21) Appl. No.: 13/560,374

(22) Filed: Jul. 27, 2012

(65) Prior Publication Data

US 2013/0094823 A1   Apr. 18, 2013

Related U.S. Application Data

(60) Provisional application No. 61/546,694, filed on Oct. 13, 2011.

(51) Int. Cl.
*G02B 6/44* (2006.01)

(52) U.S. Cl.
CPC ............ *G02B 6/4495* (2013.01); *G02B 6/4413* (2013.01); *G02B 6/4433* (2013.01)

(58) Field of Classification Search
None
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster .................. 260/47 |
| 4,067,852 A | 1/1978 | Calundann ...................... 260/47 |
| 4,083,829 A | 4/1978 | Calundann et al. ............. 260/47 |
| 4,130,545 A | 12/1978 | Calundann .................... 260/40 P |
| 4,237,337 A | 12/1980 | Serrander .................... 174/70 R |
| 4,248,824 A | 2/1981 | Hattop .......................... 264/171 |
| 4,318,842 A | 3/1982 | East et al. ...................... 524/605 |
| 4,456,331 A | 6/1984 | Whitehead et al. ........ 350/96.23 |
| 4,468,364 A | 8/1984 | Ide ............................ 264/176 R |
| 4,707,074 A | 11/1987 | Heywood .................. 350/96.23 |
| 4,729,628 A | 3/1988 | Kraft et al. ................. 350/96.23 |
| 4,848,868 A | 7/1989 | Rohner ...................... 350/96.23 |
| 5,218,659 A | 6/1993 | Schneider ..................... 385/110 |
| 5,360,497 A | 11/1994 | Schneider et al. ............. 156/47 |
| 5,442,722 A | 8/1995 | DeCarlo ....................... 385/114 |
| 5,469,523 A * | 11/1995 | Blew et al. .................... 385/101 |
| 5,636,308 A | 6/1997 | Personne et al. ............. 385/102 |
| 5,651,081 A | 7/1997 | Blew et al. .................... 385/101 |
| 5,668,912 A | 9/1997 | Keller |
| 5,717,805 A | 2/1998 | Stulpin ........................ 385/114 |
| 5,737,470 A | 4/1998 | Nagano et al. ................ 385/114 |

(Continued)

FOREIGN PATENT DOCUMENTS

| | | | |
|---|---|---|---|
| DE | 4421456 A1 | 12/1995 | ............. B29C 47/02 |
| EP | 647866 A1 | 4/1995 | ............... G02B 6/44 |

(Continued)

OTHER PUBLICATIONS

U.S. Appl. No. 13/445,517, filed Apr. 12, 2012, Eric R. Logan, 29 pages.

(Continued)

*Primary Examiner* — Tina Wong
(74) *Attorney, Agent, or Firm* — William D. Doyle (57) ABSTRACT

Cables are constructed with embedded discontinuities in the cable jacket that allow the jacket to be torn to provide access to the cable core. The discontinuities can be longitudinally extending strips of polymer material coextruded in the cable jacket.

20 Claims, 6 Drawing Sheets

(56) References Cited

U.S. PATENT DOCUMENTS

| | | | |
|---|---|---|---|
| 5,970,196 A | 10/1999 | Greveling et al. | 385/114 |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,137,936 A | 10/2000 | Fitz et al. | 385/113 |
| 6,167,180 A | 12/2000 | Keller | 385/113 |
| 6,222,969 B1 | 4/2001 | Botelho et al. | 385/114 |
| 6,311,000 B1 | 10/2001 | Schneider | 385/113 |
| 6,351,589 B1 | 2/2002 | Leggett | 385/128 |
| 6,377,738 B1* | 4/2002 | Anderson et al. | 385/113 |
| 6,404,962 B1 | 6/2002 | Hardwick, III et al. | 385/114 |
| 6,519,396 B2 | 2/2003 | Schneider et al. | 385/101 |
| 6,542,674 B1 | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,563,991 B1 | 5/2003 | Witt et al. | 385/107 |
| 6,603,908 B2 | 8/2003 | Dallas et al. | 385/109 |
| 6,661,956 B2 | 12/2003 | Yamasaki et al. | 385/109 |
| 6,704,481 B2 | 3/2004 | Gaillard et al. | 385/113 |
| 6,728,455 B2 | 4/2004 | Kusakari et al. | 385/113 |
| 6,760,522 B2* | 7/2004 | Okada et al. | 385/109 |
| 6,766,091 B2 | 7/2004 | Beuth et al. | 385/128 |
| 6,813,421 B2 | 11/2004 | Lail et al. | 385/101 |
| 6,876,798 B2 | 4/2005 | Triplett et al. | 385/100 |
| 6,957,000 B2 | 10/2005 | McAlpine et al. | 385/102 |
| 7,029,137 B2 | 4/2006 | Lionetti et al. | 362/84 |
| 7,050,685 B2 | 5/2006 | Plemmons et al. | 385/109 |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/102 |
| 7,187,830 B2* | 3/2007 | Blazer | 385/114 |
| 7,197,215 B2 | 3/2007 | Baird et al. | 385/113 |
| 7,218,821 B2 | 5/2007 | Bocanegra et al. | 385/103 |
| 7,225,534 B2 | 6/2007 | Kachmar | 29/825 |
| 7,251,411 B1 | 7/2007 | Lu et al. | 385/147 |
| 7,272,282 B1 | 9/2007 | Seddon et al. | |
| 7,346,244 B2 | 3/2008 | Gowan et al. | 385/113 |
| 7,379,642 B2 | 5/2008 | Kachmar | 385/102 |
| 7,391,943 B2 | 6/2008 | Blazer et al. | 385/100 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,471,862 B2 | 12/2008 | Bringuier et al. | 385/113 |
| 7,480,436 B2 | 1/2009 | Wells et al. | 385/134 |
| 7,489,843 B2 | 2/2009 | Carlson et al. | 385/100 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/113 |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,693,375 B2 | 4/2010 | Freeland et al. | 385/100 |
| 7,787,727 B2 | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 8,582,940 B2* | 11/2013 | Abernathy et al. | 385/100 |
| 8,682,124 B2* | 3/2014 | Logan | 385/100 |
| 2003/0118295 A1 | 6/2003 | Lail et al. | 385/101 |
| 2004/0086242 A1* | 5/2004 | McAlpine et al. | 385/102 |
| 2006/0045443 A1* | 3/2006 | Blazer | 385/114 |
| 2006/0127016 A1* | 6/2006 | Baird et al. | 385/113 |
| 2006/0291787 A1 | 12/2006 | Seddon | 385/113 |
| 2008/0013899 A1 | 1/2008 | Gowan et al. | 385/113 |
| 2008/0193092 A1* | 8/2008 | Greenwood et al. | 385/113 |
| 2008/0253723 A1 | 10/2008 | Stokes et al. | |
| 2009/0087148 A1 | 4/2009 | Bradley et al. | 385/76 |
| 2009/0274425 A1 | 11/2009 | Caldwell et al. | 385/102 |
| 2009/0274426 A1 | 11/2009 | Lail | 385/105 |
| 2009/0297107 A1 | 12/2009 | Tatat | |
| 2009/0317039 A1 | 12/2009 | Blazer et al. | 385/107 |
| 2009/0324182 A1 | 12/2009 | Kachmar et al. | 385/104 |
| 2010/0132973 A1 | 6/2010 | Fitz et al. | 174/102 R |
| 2011/0142403 A1* | 6/2011 | Hurley | 385/102 |
| 2011/0217010 A1 | 9/2011 | Kachmar | 385/111 |
| 2011/0229098 A1 | 9/2011 | Abernathy et al. | 385/102 |

FOREIGN PATENT DOCUMENTS

| | | | |
|---|---|---|---|
| EP | 749129 A1 | 12/1996 | H01B 7/00 |
| EP | 1168024 B1 | 6/2006 | G02B 6/44 |
| EP | 1376156 B1 | 7/2006 | G02B 1/04 |
| JP | 60-91306 A | 5/1985 | G02B 6/24 |
| JP | 63-120206 U | 8/1988 | G02B 6/08 |
| JP | 9-230184 A | 9/1997 | G02B 6/44 |
| JP | 2005-148373 A | 6/2005 | G02B 6/44 |
| JP | 2005-345622 A | 12/2005 | G02B 6/44 |
| JP | 2006-162703 A | 6/2006 | G02B 6/44 |
| JP | 2006-171570 A | 6/2006 | G02B 6/44 |
| JP | 2006-251769 A | 9/2006 | G02B 6/44 |
| JP | 2006-251770 A | 9/2006 | G02B 6/44 |
| JP | 2006-267600 A | 10/2006 | G02B 6/44 |
| JP | 2007-272006 A | 10/2007 | G02B 6/44 |
| JP | 2009-37150 A | 2/2009 | G02B 6/44 |
| JP | 2009-258153 A | 11/2009 | G02B 6/44 |
| KR | 2006-0081266 | 7/2006 | G02B 6/44 |
| KR | 2006-0107414 | 10/2006 | G02B 6/02 |
| WO | 03/046074 A1 | 6/2003 | C08L 23/16 |
| WO | 2004/021367 A2 | 3/2004 | H01B 7/00 |
| WO | 2005/096053 A1 | 10/2005 | G02B 6/44 |
| WO | 2006/097540 A1 | 9/2006 | G02B 6/44 |
| WO | 2011/109498 A2 | 9/2011 | |
| WO | 2011/137236 A1 | 11/2011 | B29C 47/02 |
| WO | 2012/058181 A1 | 5/2012 | G02B 6/44 |
| WO | 2012/071490 A2 | 5/2012 | B29C 47/02 |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No. RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.
Australian Office Action for Application No. 2012241089, dated Mar. 6, 2015, 4 pages.

* cited by examiner

FIBER OPTIC CABLES WITH EXTRUDED ACCESS FEATURES FOR ACCESS TO A CABLE CAVITY

RELATED APPLICATIONS

This application claims the benefit priority under 35 U.S.C. §119 of U.S. Provisional Application No. 61/546,694 filed on Oct. 13, 2011, the content of which is relied upon and incorporated herein by reference in its entirety.

BACKGROUND

In order to terminate the fibers within a cable, the fibers must be accessed within the protective structure that comprises the cable jacket. Access to the cable interior can be difficult if the cable is designed to maximize the protection of the fibers within. In most cases cable access is achieved through extensive use of sharp cutting tools which can be dangerous if handled improperly. In addition to the safety concern regarding cable access, additional time during fiber access and termination increases the cost of installing the cable.

SUMMARY

According to one aspect of the present invention a fiber optic cable comprises at least one optical fiber, a first strength member and a second strength member, and a cable jacket. The cable jacket comprises a primary portion of a first polymeric extruded material having two major surfaces and at least partially defining a cavity, the cavity having a cavity minor dimension generally oriented with a minor dimension of the fiber optic cable, wherein the at least one optical fiber is disposed within the cavity; and at least one discontinuity of a second extruded material at least partially embedded in the primary portion. The discontinuity extends along a length of the cable, and the first material being different from the second material, wherein the at least one discontinuity allows the jacket to be separated at the discontinuity to provide access to the cavity.

According to another aspect, a fiber optic cable comprises at least one optical fiber, at least one strength member, and a cable jacket. The cable jacket comprises a primary portion of a first polymeric extruded material having two major surfaces and at least partially defining a cavity, wherein the at least one optical fiber is disposed within the cavity, and at least one discontinuity of a second polymer extruded material at least partially embedded in the primary portion. The discontinuity extends along a length of the cable, with the first material being different from the second material. The at least one discontinuity and the primary portion allow the jacket to be separated at the discontinuity to provide access to the cavity. A nearest point of the discontinuity is within 0.5 mm of a nearest point of the cavity, and the first extruded material is comprised of at least eighty percent by weight of a polyethylene. The second extruded polymeric material is comprised of at least seventy percent by weight of a second polymer and at least 2 percent by weight of a polyethylene.

According to yet another aspect, a slotted core fiber optic cable comprises a core comprising at least four slots in part defined by a plurality of legs, at least one optical fiber in each of the slots, a jacket surrounding and enclosing the core, the jacket comprising a primary portion of a first polymeric extruded material surrounding the core; and at least one discontinuity of a second extruded material. The discontinuity is proximate to at least one slot and at least partially embedded in the primary portion, the discontinuity extending along a length of the cable. The first material is different from the second material, wherein the at least one discontinuity allows the jacket to be separated at the discontinuity to provide access to a proximate slot.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 1:
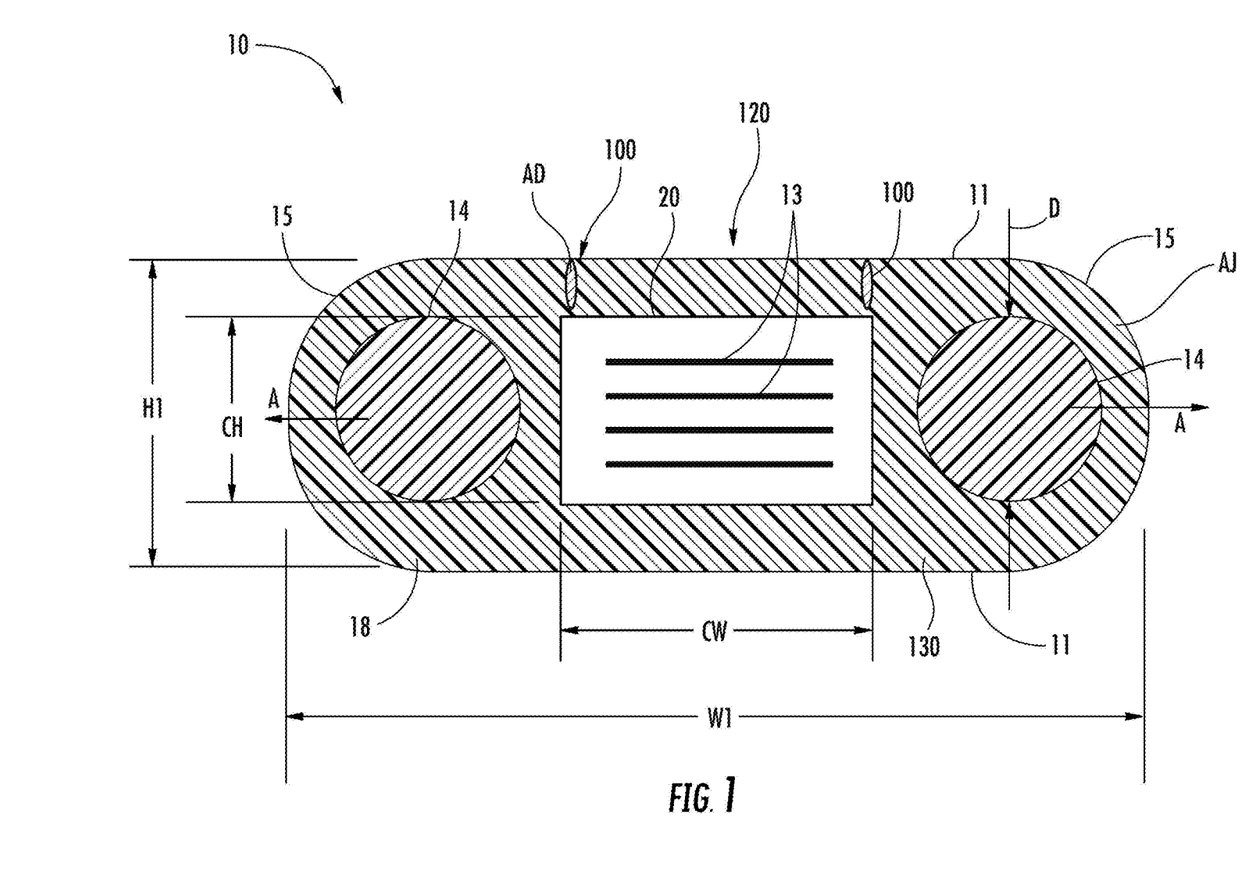
FIG. 1 is a cross-section of a fiber optic cable according to a first embodiment.

FIG. 1 depicts an exemplary fiber optic cable 10 according to the present invention that can be configured for use as a drop cable, a distribution cable, or other suitable portions of an optical network. Generally speaking, a distribution cable has a relatively high optical fiber count such twelve or more optical fibers for further distribution to the optical network. On the other hand, a drop cable will have a relatively low optical count such as up to four optical fibers for routing towards a subscriber or a business, but drop cables may include higher fiber counts. Cable 10 generally includes at least one optical fiber 12 which can be part of an optical fiber ribbon 13 having additional fibers, two strength members 14, and a cable jacket 18 with a cavity 20 formed therein.

The cable 10 has two major surfaces 11 that are generally flat and are connected by curved or arcuate end surfaces 15. The strength members 14 are disposed on opposing sides of a cavity 20. Strength members 14 are preferably a dielectric material such as glass-reinforced plastic, so that the cable is all-dielectric. However, strength members may be a conductive material such as steel or the like. Cavity 20 is sized to allow multiple ribbons 13 the adequate freedom to move when, for instance, the cable is bent while maintaining adequate optical attenuation performance of the optical fibers within the cable.

Cable 10 is advantageous because it can be easily accessed from either of the generally planar sides of the cable, thereby allowing access to the desired optical fiber. Ribbons from either side of the ribbon stack, i.e., top or bottom, can be accessed by opening the cable at the respective planar side. The cavity 20 has a cavity minor dimension CH and a cavity major dimension CW and has a generally rectangular shape with a fixed orientation, but other shapes and arrangements are possible such as generally square, round, or oval. The cavity minor dimension CH is generally aligned with a minor dimension H1 of distribution cable 10 and cavity major dimension CW is generally aligned with the major dimension W1 of cable 10. The strength members 14 are disposed on opposite sides of cavity 20 and are sized so that a strength member dimension D generally aligned with minor dimension H1 of the cable is about the same size or smaller than the cavity minor dimension CH. By way of example, cavity minor dimension CH is sized so it is about five percent larger or more than a strength member dimension D that is generally aligned with minor dimension H1 of the cable. The exemplary strength member 14 is a round glass-reinforced plastic (GRP) having a diameter of about 2.3 millimeters and cavity minor dimension CH is about 2.5 millimeters. The relative shape and size of the cavity 20 and the strength members 14 allow the craftsman or automation process has simple and easy access to cavity 20 by running a utility blade or cutting tool along the length of the cable without cutting into strength members 14, thereby allowing entry to cavity 20 while inhibiting damage to the at least one optical fiber 12 or strength members during the access procedure. Additionally, the generally flat major surfaces of the cables are advantageous because they allow for a smaller cable footprint and uses less jacket material compared with round cables.

By way of example, in distribution applications the major dimension W1 is about 15 millimeters or less and the minor dimension H1 is preferably about 10 millimeters or less. In drop applications, major dimension W1 is about 10 millimeters or less and the minor dimension H1 is preferably about 5 millimeters or less. The optical fibers may have an excess fiber length (EFL) compared with a length of cavity 20. For instance, optical fibers have an EFL of between about 0.0 and about 0.5 percent; however, in some instances the EFL may also be slightly negative. Likewise, ribbons can have an excess ribbon length (ERL). By way of example, the ERL may be in the range of about 0.1 percent to about 1.2 percent. The cavity 20 may be filled with a thixotropic grease or gel (not illustrated) to inhibit the migration of water along the cavity, one or more water-swellable yarns, elongate compressible tapes and other structures can also serve for blocking the migration of water along the cable, as well as providing coupling between the cavity and the fibers.

The cavity 20 also has an axial centerline (not illustrated) located at the center of its cross-section that may be generally aligned with the axial centerlines of the strength members 14 along a common plane A-A. The orientation of the strength components 14 on the common plane A-A in part provides preferential bend characteristics to the fiber optic cable 10. The axial centerline of the cavity 20 need not be exactly aligned with the plane passing through the axial centerlines of the strength components 130, and may move off of the plane, e.g. "up" and "down", with respect to the strength components 14 along the length of the cable 10. For the purposes of this specification, when the cavity said to be "generally aligned with" or "aligned with" a plane passing through two strength components, it is understood that the cavity centerline may be slightly offset from that plane, for example, by 0.5 millimeters in either direction.

The jacket 18 can be formed primarily from polymer materials, and can be generally referred to as "polymeric." In this specification, the term "polymer" and "polymeric" include materials such as, for examples, copolymers, and polymer materials including additives such as fillers. The strength components are wholly embedded in the jacket 18. Quantities of adhesion promoter may be included on the strength components 14 to promote bonding with the cable jacket 18. For the purposes of this specification, a strength component is considered to be "in contact" with a cable jacket if an adhesion promoter is interposed between the strength component and the cable jacket to promote bonding therebetween.

Figure 2:
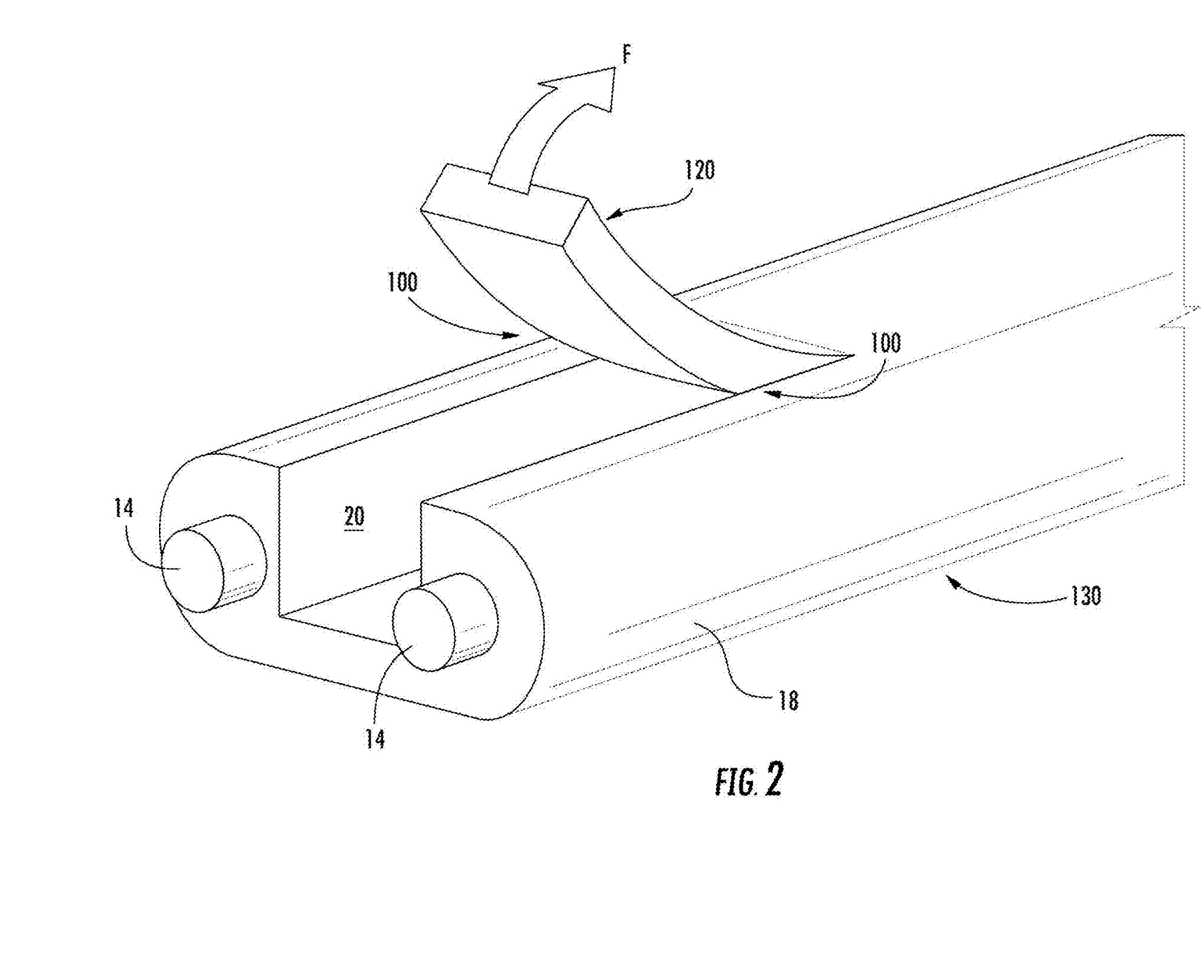
FIG. 2 is a partial cutaway view of the fiber optic cable of FIG. 1 with a section of the cable jacket being peeled away from the cable cavity.

According to one aspect of the present embodiment, the jacket 18 includes a separation feature that facilitates access to the cavity 20. In the exemplary embodiment, the separation feature is a pair of discontinuities 100 that extend along the length of the cable 10. Referring also to FIG. 2, the discontinuities 100 are arranged to provide access to the cavity 20 by allowing a section 120 of the jacket 18 between the discontinuities to be peeled back away from a primary portion 130 of the jacket 18. The section 120 of the jacket peeled back as shown in FIG. 2 allows access to the cavity 20. In this specification, the term "discontinuity" indicates a portion of the jacket 18 of different, second material composition than a primary portion 130 or first material of the jacket 18. The primary portion 130 of the jacket 18 can essentially be a unitary extruded polymer coating surrounding, embedding, and contacting the strength components 130 and the discontinuities 100. The discontinuities 100 need not be wholly embedded, and may extend to the cavity 20, or to the surface 11 of the cable 10. Referring to FIGS. 1 and 2, the discontinuities 100 extend longitudinally through the primary portion 130 along a selected length of the cable 10. Discontinuities extending along the entire length of the cable 10 are effective in providing access to the cavity 20. Shorter discontinuity lengths may also be effective however. For example, discontinuities having lengths of at least 10 centimeters along the length of the cable may be sufficient.

In the exemplary embodiment, the discontinuities 100 are bonded to the primary portion 130 of the jacket 18 when the jacket is extruded. The primary portion 130 and the discontinuities 100 can be formed from extrudable polymers, so that as the extrudates used to form the primary portion 130 and the discontinuities 100 cool and solidify, the extrudates become bonded to a desired degree. When the discontinuities 100 are formed while extruding the primary portion 130 of the jacket, the bond between discontinuity 100 and the remainder of the jacket 18 can be generally described as enabled by polymer chain entanglement as the jacket 18 solidifies. The degree of bonding between the primary jacket portion and the material within the discontinuity 100, the cohesion of the primary and second materials, and the shape of the discontinuity 100 can be selected to provide desirable separation properties at the discontinuities 100. The jacket 18 can accordingly comprise a cohesive, unitary, composite polymeric structure.

A discontinuity can be extruded into the primary portion 130 of the jacket 18 at any location where a point of access might be formed. In the illustrated embodiment, the discontinuities 100 are adjacent to the cavity 20, and both discontinuities 100 are wholly embedded or surrounded by the primary portion 130 of the jacket 18. The nearest point of the discontinuities 100 can be, for example, within 0.3 millimeter of the closest part of the cavity 20. In the illustrated embodiment, the closest point between the discontinuities and the cavity is less than 0.2 mm. The discontinuities 100 can be spaced a distance measured along a width of the cable that is between 40-120% of the cavity width CW.

As shown in FIG. 1, the discontinuities 100 can be relatively narrow strips in the jacket 18, and may occupy relatively small portions of the total jacket cross-sectional area AJ. For example, the discontinuities 100 can have cross-sectional areas AD that are less than 10% of AJ, and as low as less than 5% of AJ. In the illustrated embodiment, the discontinuities 100 each have cross-sectional areas AD that are less than 3% of AJ. In FIG. 1, two discontinuities 100 are formed in the jacket 18 to facilitate opening of the jacket 18. Depending on the form that the cavity 20 takes, the number, spacing, shape, composition and other aspects of the discontinuities 100 can be varied. For example, a single discontinuity in the jacket 18 may be sufficient to allow the cable jacket 18 to be opened away from the cavity 20.

The ratio of the adhesion strength between the first material of the primary portion 130 and the second material of the discontinuities 100 is also a factor in determining the shape and composition discontinuities. The ratio of the second material cohesive strength to the adhesion strength between the first and second materials (Ratio A) can be in the range of, for example, 1:20 to 20:1. With a secondary cohesive discontinuity 100 strength to adhesion strength of 1:20, there is very little cohesive strength within the second material compared to the adhesion between the two materials and thus failure will take place within the second material. A ratio of 20:1 indicates a relatively strong cohesive second material compared to the adhesive bond between the materials and thus failure will take place at the interface between the primary portion 130 and the discontinuity 100. In the illustrated embodiment, the adhesion ratio is at least 4:1. It is the failure of the material or bond that allows for a sufficient stress concentration to develop at the tip of the discontinuity 100 and thus initiate failure of the first material. The ratio of the first material strength to the adhesion between the first and the second material (ratio B) can be, for example, in the range of 20:1 and 400:1. Ratio B in the range of 1:1 and 20:1 will follow a linear relationship with ratio A in the range of ratio A stated above.

The materials and processes used to form the primary portion 130 and the discontinuities 100 can be selected for relatively easy access to the cavity 20 by tearing the jacket 18. The cable 110 may be constructed to meet other requirements for robustness, such as requirements for the jacket 18 stay intact under tensile loads, twisting, in temperature variations, and when subjected to other known cable test criteria, such as, for example, ICEA 460, and GR20. In the illustrated embodiment, the primary portion 130 in the illustrated jacket 18 is extruded from medium density polyethylene (MDPE), and the discontinuities 100 are extruded from a second material primarily of polypropylene (PP). The jacket 18 is formed in a coextrusion process so that the primary portion 130 and the discontinuities 100 bond during cooling to form relatively strong bonds. The cable jacket 18 can be robust yet relatively low peel forces are sufficient to shear or tear the jacket 18 along the discontinuities 100. Without being bound by theory, Applicants believe the bond between polypropylene of the discontinuity and polyethylene of the primary portion can be created by adding selected quantities of ethylene compounded in the polypropylene discontinuity. The quantities of polyethylene in the discontinuity 100 are believed to bond with the polyethylene of the primary portion 130, as well as resulting in molecular entanglement between the polyethylene and polypropylene. According to this understanding, the amount of ethylene in the polypropylene extrudate used to form the discontinuities 100 can be increased to increase the bond between the discontinuities and the remainder of the jacket 18.

In general, if the primary portion 130 is formed from a first extruded polymer material, and the discontinuities 100 are formed from a second extruded polymer material, the discontinuities can include from 0.5%-20% by weight of the first polymer material. One embodiment of a thin film discontinuity contains PP with about 9% PE. Higher PE contents, such as to up 20% PE, are also possible. PE contents of less than 0.2% in PP may result in insufficient bonding between the primary portion and a discontinuity. In one embodiment, the first polymer material is comprised of at least eighty percent by weight of a first polymer, and the second extruded polymeric material is comprised of at least seventy percent by weight of a second polymer and at least 0.5 percent by weight of the first polymer. In this embodiment, the first polymer can be PE and the second polymer can be PP.

Coextrusion of the discontinuities 100 and the primary portion 130 can be achieved by adapting a conventional extrusion head. The extrusion head is adapted by adding one or more apertures through the extrusion head that allow the introduction of a second, molten extrudate material into the molten first extrudate used to form the primary portion 130 of the jacket 18. The first and second extrudate materials are allowed to cool and solidify together and to achieve a desired degree of bonding between the first portion and the discontinuities. According to the present embodiment, the first and second extrudate materials can be introduced into and extruded through a common extrusion head so that discontinuities and the first jacket portion are coextruded at the same location.

The peel force required to pull back the section 120 can be measured as a direct force measurement, in Newtons, of the force a person must exert as the jacket section is peeled away from the primary portion 130. It is understood that the jacket will not be perfectly uniform, and that a person or machine cannot exert a perfectly uniform force as the jacket is peeled, so "peel forces" described in this specification indicate an average force exerted as a distance of the jacket section is peeled back. It is also understood that peel forces according to the present embodiments are measured without any additional modifications to the cable jacket exterior, such as by scoring. The peel forces can be relatively low when compared to the forces required to access a cable without extruded discontinuities. For example, a peel force required to peel the section 120 shown in FIGS. 1-2 may be less than about 80 Newtons (N). In exemplary embodiments, the peel force required may be from about 10 N to about 50 N, and in yet further exemplary embodiments may be from about 20 N to about 40 N. Peel forces are defined herein to include any force great enough to cause the jacket material to rip, tear, or otherwise separate along the discontinuities for accessing the cavity 20. Spaced discontinuities allow access at relatively low peel forces.

It is relatively easy to measure peel force. Using cable 10 (FIG. 1) as a reference, at one end of the cable, a small hole is placed in the section 120 proximal to the edge of the jacket, and one end of an "S" hook is inserted into the hole in the jacket. The hole is formed midway between the two discontinuities. A lanyard or wire is attached to the other end of the S hook. The lanyard is fixed to a force gauge, such as a Chatillon gauge available from Ametek Test and Calibration Instruments of Largo, Fla. The force gauge is pulled by hand or by some mechanical means, away from the cable at an angle of 45 degrees to the cable centerline, until the section 120 of the jacket attached to the S hook peels away from the rest of the jacket 18. The jacket section is pulled for a distance of 250-500 mm away from the initial jacket removal location. The average peel can be calculated as the average force measured by the force gauge as the jacket section is pulled along the selected distance.

In an alternate method of measuring peel force, a force testing machine, such as those available from Instron®, pulls the section of cable away from the remainder of the cable at angle of 90 degrees to the remainder of the cable 10. The cable is secured to a linear slide that translates the cable beneath the portion of the machine that is secured to the jacket section being peeled away. In this arrangement, the cable 10 slides beneath the force gauge that measures the tension on the section being removed, so that the section can be peeled away at a 90 degree angle. The tension in the removable section can be averaged over a desired distance to obtain the average peel force.

Figure 3:
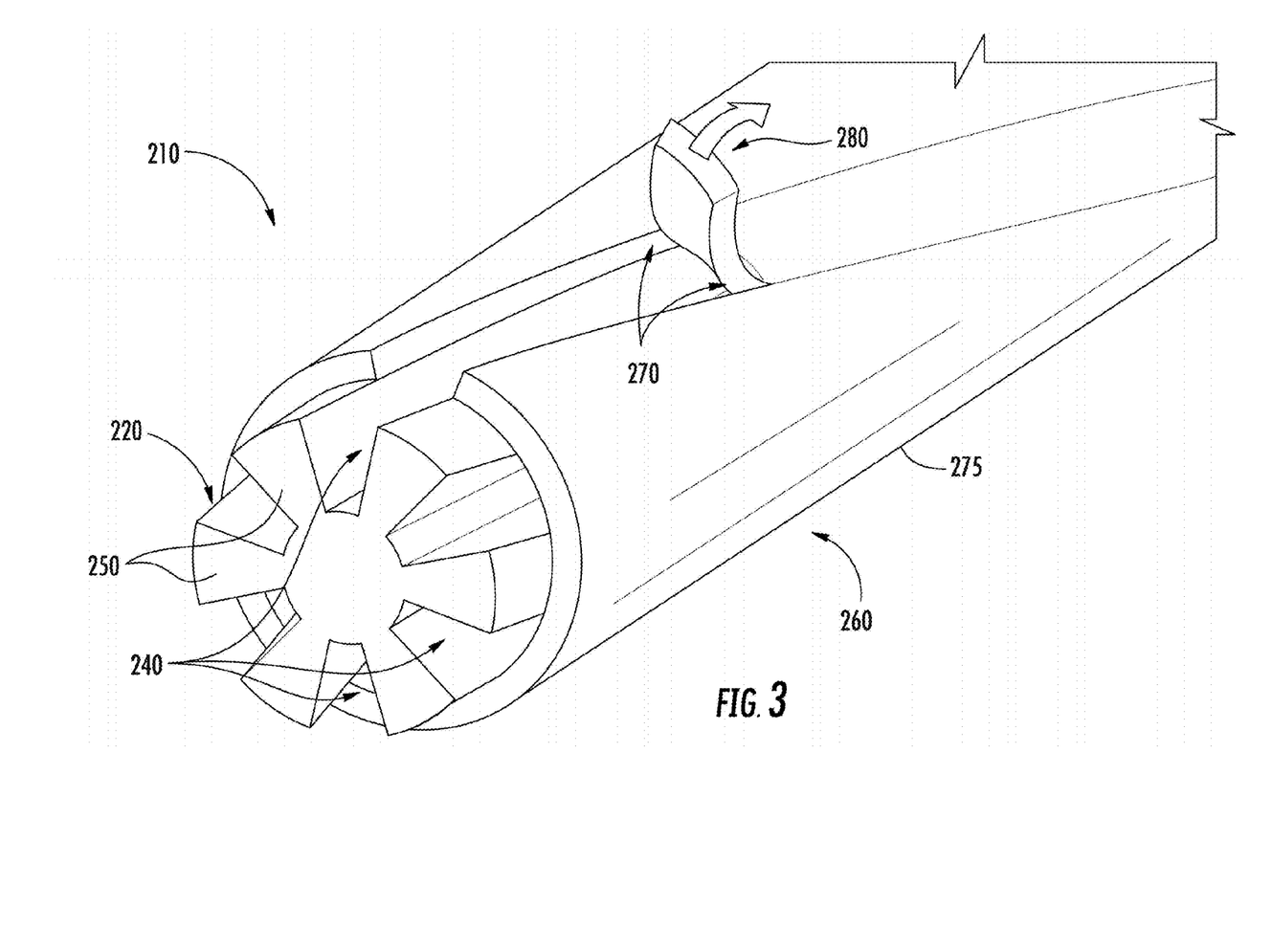
FIG. 3 is a partial cutaway view of a slotted core fiber optic cable with a section of the cable jacket being peeled away from the cable cavity.

FIG. 3 illustrates a slotted core cable 210 according to an embodiment of the invention. The cable 210 includes a flexible core 220 having a plurality of symmetrical slots 240 disposed along the length of core 220. A central member (not shown) can be included in the core 220 to provide tensile strength. A plurality of legs 250 in part define the slots 240. A plurality of stacked optical fiber ribbons (not shown) may be disposed within each of the slots 240. A polymeric jacket 260 surrounds the core and encloses the slots 240. According to one aspect of the present embodiment, one or more discontinuities 270 are at least partially embedded in a primary portion 275 of the jacket. The discontinuities 270 can extend along the cable 210 to enable ease of access to the individual slots 240, or can extend along a selected length of the cable at intervals. In FIG. 3, a section 280 located between a pair of discontinuities 270 can be peeled back to provide access to a slot 240.

According to one aspect of the embodiment shown in FIG. 3, the cable 210 can include at least four slots 240. Each slot 240 of the cable 210 can include one or more discontinuities 270 adjacent to the slot 240 to provide access to a respective slot 240. Each slot 240 can include, for example, a pair of discontinuities 270 adjacent to the slot 240, with a section 280 of the jacket 260 being removable as shown in FIG. 3. The slots 240 can wind about the centerline of the core 220 along the length of the cable 210 in a helical, SZ, or other fashion, and the discontinuity or discontinuities 270 associated with each slot 240 can also wind helically, SZ, etc. about the core 220 centerline so to provide access to their respective slot 240.

The materials for the primary portion of the jacket 260 and the discontinuities can be similar or identical to those materials discussed with reference to FIGS. 1 and 2. The peel force required to peel back a section 280 may be similar or identical to the peel forces discussed with reference to FIGS. 1 and 2.

Figure 4:
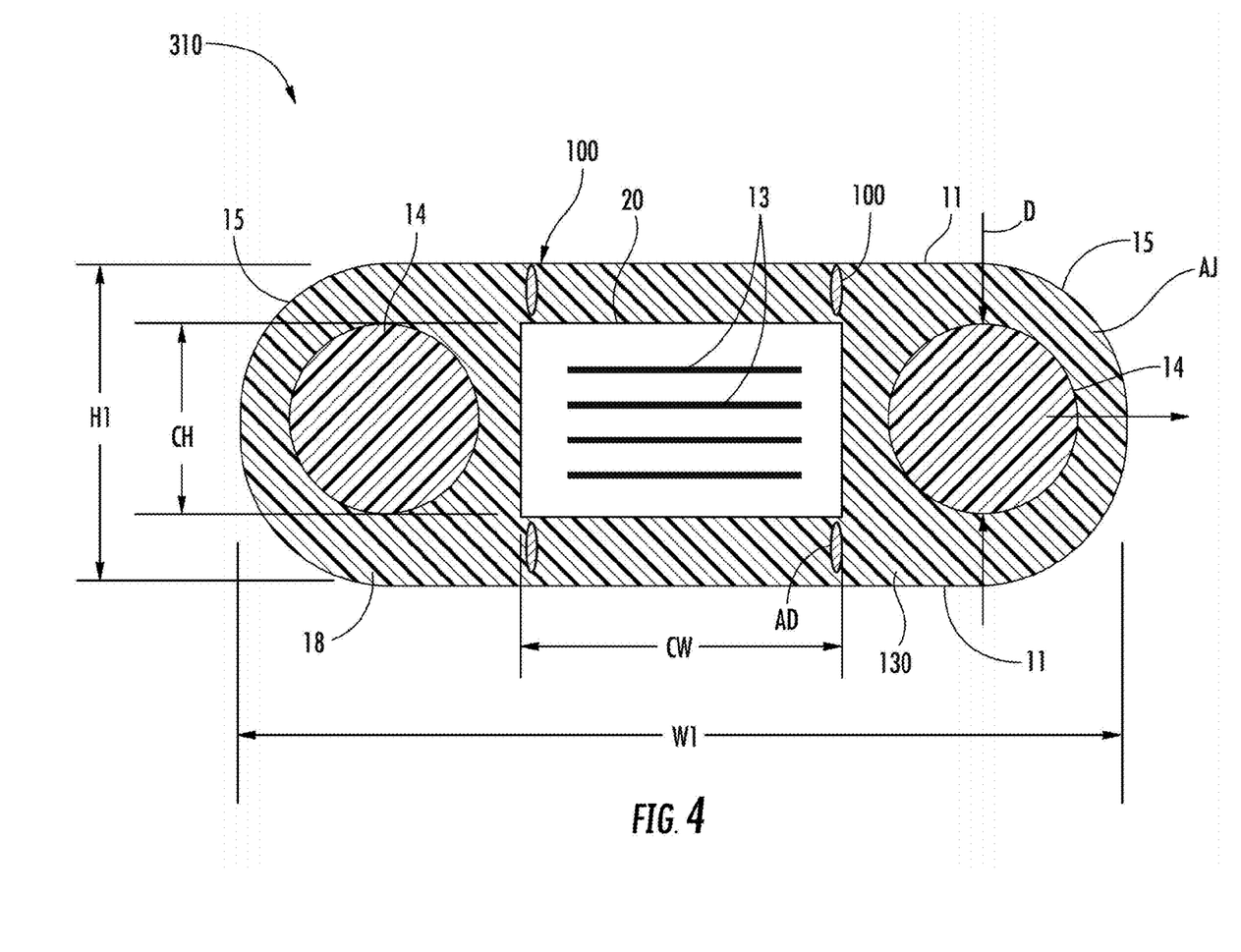
FIG. 4 is a cross-section of a fiber optic cable similar to FIG. 1 with a different arrangement of access features.

FIG. 4 illustrates a cable 310 that can be identical in shape and in composition to that of FIG. 1, except with both discontinuities 100 located on one side of the cavity 20. This allows the cavity 20 to be accessed by pulling the side of the cable away in the direction of the arrow, so that the jacket 18 separates at the discontinuities and exposes the cavity 20. As shown in FIG. 4, four discontinuities can be included in the cable jacket 18 so that the cavity 20 can be accessed by multiple methods.

The cable jacket primary portions and the discontinuities described in this specification can be made from various polymer materials. Either primary portion or discontinuity may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride PVDF, filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates. The terms "polymer" and "polymeric" as used in this specification indicate extrudable materials consisting primarily of polymers, but allows for the inclusion of filler materials, for example.

In general, the desirable separation properties disclosed in this specification may be obtained by coextruding the discontinuities from a different material than the material used to form the primary portion of the jacket. As an alternative method, the discontinuities may be made from the same material as the remainder of the jacket, but subjected to different curing conditions, for example.

According to the present embodiments, the discontinuities can extend along the entire length of the illustrated cables, or for shorter distances. For example, one or more discontinuities can extend along a distance of at least 10 centimeters along the cable. The discontinuities can be repeated at regular or irregular patterns along the length of the cables.

Figure 5:
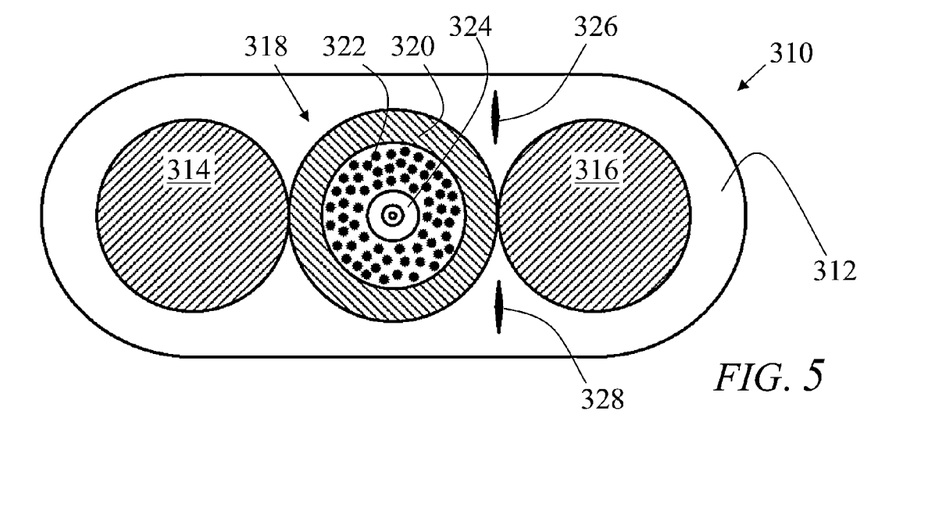
FIGS. 5-7 are cross-sectional views of fiber optic cables according to other alternate embodiments.
Figure 6:
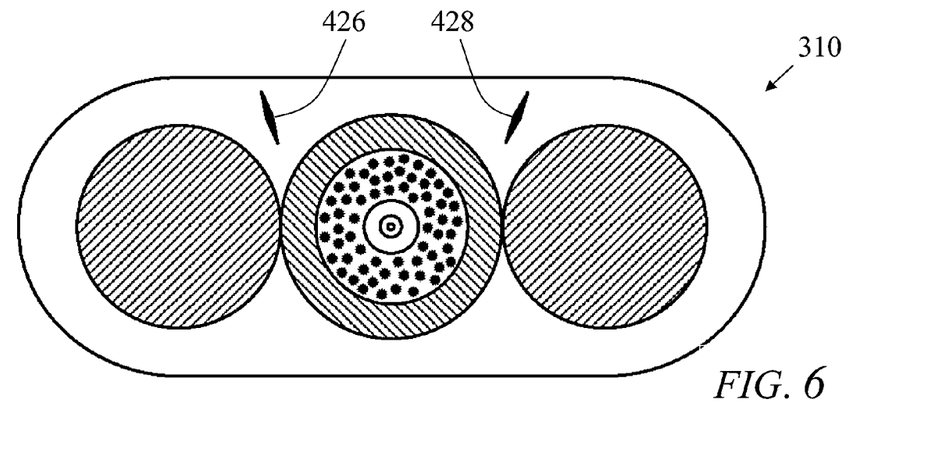
Figure 7:
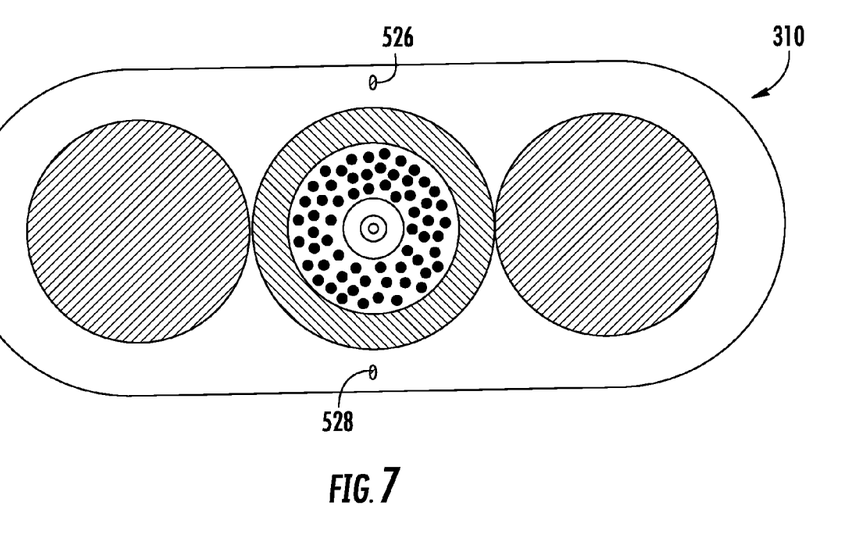

Referring now to FIGS. 5-7, a fiber optic drop cable 310 includes a jacket 312, first and second strength members 314, 316 (e.g., glass-reinforced plastic rods, aramid-reinforced plastic or resin, steel rods; or other numbers of strength members), and an optical element 318 in a cavity of the jacket 312, such as an indoor cable tube 320 (e.g., polyvinyl chloride with fire-retardant additives) containing aramid fiber 322 or another strength member surrounding a tight-buffered glass optical fiber 324. The aramid fiber 322 may be grouped in yarns and may be stranded with a lay length of at least 200 mm, or may be oriented generally parallel with the optical fiber 324 (i.e., not stranded). In some embodiments, the first and second strength members 314, 316 contact or nearly contact (e.g., within 25 micrometers, within 10 micrometers) the optical element 318.

According to an exemplary embodiment, the optical element 318 is wider than the strength members 314, 316, but not much wider, so as to reduce the volume of jacketing material in the interstices between the strength members 314, 316 and optical element 318. In some such embodiments, the diameter of the optical element 318 is greater than the diameter of either first or second strength members 314, 316, but less than 120% or less than 110% the diameter of the larger of the first or second strength elements 314, 316. In other contemplated embodiments, the strength members 314, 316 and/or the optical element 318 may not be round.

The optical fiber 324 may be a single-mode fiber, multi-mode fiber, or even a multi-core fiber, which may particularly benefit from the compact drop cable structure due to crush resistance and controlled bending (e.g., the preferential bend axis of the cable may be aligned with the preferred (i.e., lowest net attenuation) axis of the multi-core fiber). In still other contemplated embodiments, the optical element may include more than one optical fiber, such as two, four, six, twelve, etc. optical fibers in a loose buffer tube, or tightly packed into a buffer tube such that the optical fiber contact at least two others of the optical fibers.

Figure 8:
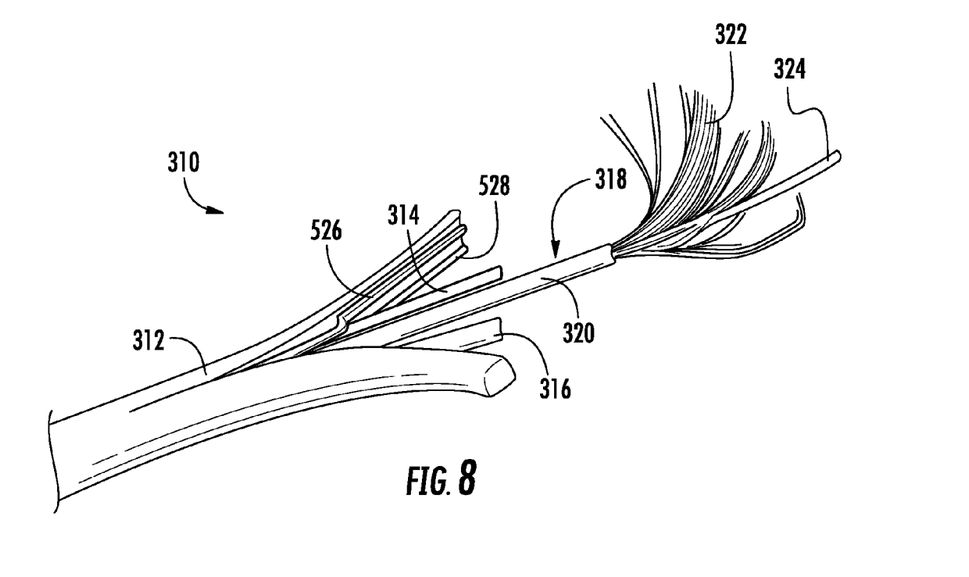
FIG. 8 is a perspective-view digital image of the fiber optic cable of FIG. 7.

According to an exemplary embodiment, the cable 310 includes co-extruded discontinuities 326, 328, 426, 428, 526, 528 of material in the form of relatively narrow and/or elongate tear paths (e.g., features, guides) that extend lengthwise within the jacket 312. The cable 310 in FIGS. 6 and 7-8 differ from the cable 310 in FIG. 5 with regard to the material discontinuities only. The co-extruded discontinuities 326, 328, 426, 428, 526, 528 may be a different material than the rest of the jacket (e.g., include polypropylene or another polymer). According to an exemplary embodiment, the discontinuities 326, 328, 426, 428, 526, 528 are shaped with pointed ends (e.g., diamond- or arrowhead-shaped) directed to the center and/or the outside of the jacket closest thereto, which provide stress concentrations for directing the tear location of the jacket 312 to access the optical element 318 and/or the strength members 314, 316.

In some embodiments, the cable 310 includes just one co-extruded discontinuity, such as just one of the co-extruded discontinuities 326, 328, 426, 428, 526, 528 shown in FIGS. 5-7. In other embodiments, the cable 310 includes a pair or more of discontinuities 326, 328, 426, 428, 526, 528, where the discontinuities 326, 328, 426, 428, 526, 528 may function together to facilitate peeling a segment or section of the jacket 312 open, as shown in FIG. 3 for example. The discontinuities 326, 328, 426, 428, 526, 528 may be symmetrically arranged about a central axis of the optical element such that when the jacket 312 is torn open via the discontinuities 326, 328, 426, 428, 526, 528, at least about half of the optical element 318 is accessible (e.g., at least ⅔ ths, at least 45%, at least an arc of 150-degrees of the cross-section of the optical element 318).

Many modifications and other embodiments, within the scope of the claims will be apparent to those skilled in the art. For instance, the concepts of the present invention can be used with any suitable fiber optic cable design and/or method of manufacture. Thus, it is intended that this invention covers these modifications and embodiments as well those also apparent to those skilled in the art.

What is claimed is:

1. A fiber optic cable comprising:
   at least one optical fiber;
   a first strength member and a second strength member; and
   a cable jacket comprising:
      a primary portion of an extrudable first polymeric material having two major surfaces and at least partially defining a cavity, the cavity having a cavity minor dimension generally oriented with a minor dimension of the fiber optic cable or the cavity having a diameter, wherein the at least one optical fiber is disposed within the cavity; and
      at least one discontinuity of an extrudable second polymer material at least partially embedded in and coextrudable with the primary portion, the discontinuity extending along a length of the cable, and the first polymeric material being different from the second polymer material, wherein
      the at least one discontinuity allows the jacket to be separated at the discontinuity to provide access to the cavity.

2. The fiber optic cable of claim 1, wherein the major surfaces are generally flat, and the minor dimension of the fiber optic cable being 10 millimeters or less and a major dimension of the fiber optic cable being 15 millimeters or less.

3. The fiber optic cable of claim 1, wherein the at least one discontinuity includes two discontinuities that are spaced from one another in the jacket with a section of the jacket being located between the discontinuities that can be peeled back at the discontinuities to provide access to the cavity, wherein the primary portion and the two discontinuities together form a cohesive, unitary, composite polymeric structure.

4. The fiber optic cable of claim 3, wherein the first polymeric material comprises polyethylene.

5. The fiber optic cable of claim 3, wherein a cross-sectional area of each discontinuity is less than 5% of a cross-sectional area of the jacket.

6. The fiber optic cable of claim 3, wherein each discontinuity has a bond with the primary portion, the section of the primary portion located between the first and second discontinuities being separable from a remainder of the jacket by a peel force exerted on the section, wherein the peel force is less than 50 Newtons (N).

7. The fiber optic cable of claim 1, wherein the first polymeric material is comprised of at least eighty percent by weight of a first polymer, and wherein the second polymer material is comprised of at least seventy percent by weight of a second polymer and at least 0.5 percent by weight of the first polymer.

8. The fiber optic cable of claim 1, wherein a nearest point of the at least one discontinuity is within 0.5 mm of a nearest point of the cavity.

9. The fiber optic cable of claim 1, wherein the at least one discontinuity is elongate and wholly embedded within the jacket.

10. The fiber optic cable of claim 9, wherein an end of the discontinuity is pointed, when viewed from a cross-sectional perspective of the cable.

11. A fiber optic cable comprising:
    at least one optical fiber;
    at least one strength member; and
    a cable jacket having an elongate cross-section with opposing flat sides and opposing rounded sides, the jacket comprising:
       a primary portion of a first polymeric material at least partially defining a cavity, wherein the at least one optical fiber is disposed within the cavity; and
       at least one discontinuity of a second polymer material at least partially embedded in the primary portion, the discontinuity extending along a length of the cable, and the first polymeric material being different from the second material, wherein
       the at least one discontinuity and the primary portion allow the jacket to be separated at the discontinuity to provide access to the cavity,
       a nearest point of the discontinuity is within 0.5 mm of a nearest point of the cavity, and
       the first polymeric material is comprised of at least eighty percent by weight of a polyethylene, and wherein the second polymer material is comprised of at least seventy percent by weight of a second polymer and at least 2 percent by weight of a polyethylene.

12. The fiber optic cable of claim 11, a minor dimension of the fiber optic cable being 10 millimeters or less and a major dimension of the fiber optic cable being 15 millimeters or less.

13. The fiber optic cable of claim 11, wherein the at least one discontinuity includes two discontinuities that are spaced from one another in the jacket with a section of the jacket being located between the discontinuities that can be peeled back at the discontinuities to provide access to the cavity.

14. The fiber optic cable of claim 13, wherein a cross-sectional area of each discontinuity is less than 5% of a cross-sectional area of the jacket.

15. The fiber optic cable of claim 13, wherein the discontinuities each have a bond with the primary portion of the jacket, and the section of the primary portion located between the discontinuities is separable from a remainder of the jacket by a peel force exerted on the section, wherein the peel force is less than 50 Newtons (N).

16. The fiber optic cable of claim 11, wherein a nearest point of the at least one discontinuity is within 0.5 mm of a nearest point of the cavity.

17. The fiber optic cable of claim 11, wherein the at least one discontinuity is elongate and wholly embedded within the jacket.

18. The fiber optic cable of claim 17, wherein an end of the discontinuity is pointed, when viewed from a cross-sectional perspective of the cable.

19. A fiber optic cable comprising:
    an optical element comprising a tube and at least one optical fiber therein;
    two strength members adjoining the tube on opposite sides thereof; and a cable jacket having an elongate cross-section with opposing flat sides and opposing rounded sides, the jacket comprising:
  a primary portion of a first polymeric material at least partially defining a cavity, wherein the at least one optical fiber is disposed within the cavity; and
  at least one discontinuity of a second polymer material at least partially embedded in the primary portion, the discontinuity extending along a length of the cable, and the first material being different from the second material, wherein
  the at least one discontinuity and the primary portion allow the jacket to be separated at the discontinuity to provide access to the cavity,
  a nearest point of the discontinuity is within 0.5 mm of a nearest point of the cavity, and
  the first polymeric material is comprised of at least eighty percent by weight of a polyethylene, and wherein the second polymer material is comprised of at least seventy percent by weight of a second polymer and at least 2 percent by weight of a polyethylene.

20. The fiber optic cable of claim 19, wherein the at least one discontinuity is elongate and wholly embedded within the jacket, and wherein an end of the discontinuity is pointed, when viewed from a cross-sectional perspective of the cable.

\* \* \* \* \*